United States Patent
Makke et al.

(10) Patent No.: US 10,834,550 B2
(45) Date of Patent: Nov. 10, 2020

(54) VEHICLE FEATURE CONTROL

(71) Applicant: Ford Global Technologies, LLC, Dearborn, MI (US)

(72) Inventors: Omar Makke, Lyon Township, MI (US); Oleg Yurievitch Gusikhin, Commerce Township, MI (US); Patrick Lawrence Jackson Van Hoecke, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/487,473

(22) PCT Filed: Feb. 23, 2017

(86) PCT No.: PCT/US2017/019020
§ 371 (c)(1),
(2) Date: Aug. 21, 2019

(87) PCT Pub. No.: WO2018/156128
PCT Pub. Date: Aug. 30, 2018

(65) Prior Publication Data
US 2019/0394644 A1   Dec. 26, 2019

(51) Int. Cl.
*H04W 4/40* (2018.01)
*H04W 12/08* (2009.01)
(Continued)

(52) U.S. Cl.
CPC ............ *H04W 4/40* (2018.02); *G06Q 20/322* (2013.01); *G07C 9/00309* (2013.01);
(Continued)

(58) Field of Classification Search
CPC ............... H04W 4/40; H04W 12/0609; H04W 12/0013; H04W 12/0802; H04W 12/08; G07C 9/00309; G07C 2009/00507
See application file for complete search history.

(56) References Cited

U.S. PATENT DOCUMENTS 8,841,987 B1 *  9/2014  Stanfield ............ G07C 9/00857
                                                    340/5.61
9,348,492 B1    5/2016  Penilla et al.
(Continued)

FOREIGN PATENT DOCUMENTS

KR      20130126256 A    11/2013
WO      2016198816 A1    12/2016

OTHER PUBLICATIONS

Notification of International Preliminary Report on Patentability dated Sep. 6, 2019 and Transmittal of International Search Report and Written Opinion of International Searching Authority regarding International Application No. PCT/US2017/019020 (20 pages).

*Primary Examiner* — Mohamed Barakat
(74) *Attorney, Agent, or Firm* — Brandon Hicks; Biejin Bieneman PLC (57) ABSTRACT

A system for allowing control of vehicle features includes a computer programmed to wirelessly connect to first and second user devices authorized to access, respectively, first and second sets of vehicle features. The first and second sets of vehicle features differ by at least one feature. The computer is further programmed to actuate a feature from the first set of vehicle features upon receipt of a first device command, and to actuate a feature from the second set of vehicle features upon receipt of a second device command.

20 Claims, 3 Drawing Sheets

(51) Int. Cl.
*G06Q 20/32* (2012.01)
*G07C 9/00* (2020.01)
*H04W 12/00* (2009.01)
*H04W 12/06* (2009.01)

(52) U.S. Cl.
CPC ... *H04W 12/0013* (2019.01); *H04W 12/0609* (2019.01); *H04W 12/08* (2013.01); *H04W 12/0802* (2019.01); *G07C 2009/00507* (2013.01)

(56) References Cited

U.S. PATENT DOCUMENTS

| | | |
|---|---|---|
| 9,440,605 B2 | 9/2016 | Vadgama et al. |
| 2012/0087303 A1 | 4/2012 | Kwon et al. |
| 2012/0208519 A1 | 8/2012 | Seaver |
| 2013/0144460 A1 | 6/2013 | Ricci |
| 2014/0010224 A1* | 1/2014 | Lee .................. H04W 84/12 370/338 |
| 2014/0164559 A1* | 6/2014 | Demeniuk ............ H04B 1/082 709/217 |
| 2014/0309813 A1 | 10/2014 | Ricci |
| 2015/0197205 A1 | 7/2015 | Xiong et al. |
| 2015/0329121 A1* | 11/2015 | Lim .................. H04M 1/7253 701/36 |
| 2016/0027307 A1 | 1/2016 | Abhyanker et al. |
| 2018/0154866 A1* | 6/2018 | Sute .................. F02N 11/0807 |

\* cited by examiner

VEHICLE FEATURE CONTROL

BACKGROUND

Autonomous vehicles may be useful for ride-sharing, ride-hailing, taxi, and other services transporting occupants who do not own the autonomous vehicle. Occupants of an autonomous vehicle may desire to have control of various vehicle features such as a seat heater, an infotainment device, etc.

DETAILED DESCRIPTION

Introduction

Disclosed herein is a system comprising a computer programmed to wirelessly connect to first and second user devices authorized to access, respectively, first and second sets of pluralities of vehicle features that differ by at least one feature, to actuate a feature from the first set upon receipt of a first device command, and to actuate a feature from the second set upon receipt of a second device command. The first set of vehicle features may be specified by user input not associated with the second user device, and the second set of vehicle features may be specified by a user input not associated with the first user device. The first set of vehicle features may be specified by user input associated only with the first user device, and the second set of vehicle features may be specified by a user input associated only with the second user device.

The computer may be programmed to actuate a transceiver to generate a hotspot upon arrival at a pick-up location.

The computer may be programmed to actuate the transceiver to terminate the hotspot upon arrival at a destination.

The computer may be programmed to add an additional feature to the first set of vehicle features upon receipt of an add feature command associated with the first user device.

The computer may be programmed to receive a first device authorization information associated with the first set of vehicle features and a second device authorization information associated with the second set to vehicle features, wherein the command from the first device includes the first device authorization information and the command from the second device includes the second device authorization information. The first device authorization information and the second device authorization information may include a symmetric-key algorithm.

The computer may be programmed to delete the first device authorization information upon arrival at a destination associated with first device authorization information.

The computer may be programmed to delete the first device authorization information upon receipt of a payment confirmation associated with the first device authorization information.

The computer may be programmed to add an additional feature to the first set of vehicle features upon receipt of an add feature command including the first device authorization information.

Also disclosed herein is a method comprising wirelessly connecting to a first and second user devices authorized to access, respectively, first and second sets of vehicle features; wherein the first and second sets differ by at least one feature; actuating a feature from the first set upon receipt of a first device command; and actuating a feature from the second set upon receipt of a second device command.

The method may comprise actuating a transceiver to generate a hotspot upon arrival at a pick-up location.

The method may comprise actuating the transceiver to terminate the hotspot upon arrival at a destination.

The method may comprise adding an additional feature to the first set of vehicle features upon receipt of an add feature command associated with the first user device.

The method may further comprise receiving a first device authorization information associated with the first set of vehicle features and a second device authorization information associated with the second set to vehicle features, where the command from the first device includes the first device authorization information and the command from the second device includes the second device authorization information. The first device authorization information and the second device authorization information may include a symmetric-key algorithm.

The method may comprise deleting the first device authorization information upon arrival at a destination associated with first device authorization information.

The method may comprise deleting the first device authorization information upon receipt of a payment confirmation associated with the first device authorization information.

The method may comprise adding an additional feature to the first set of vehicle features upon receipt of an add feature command including the first device authorization information.

Figure 1:
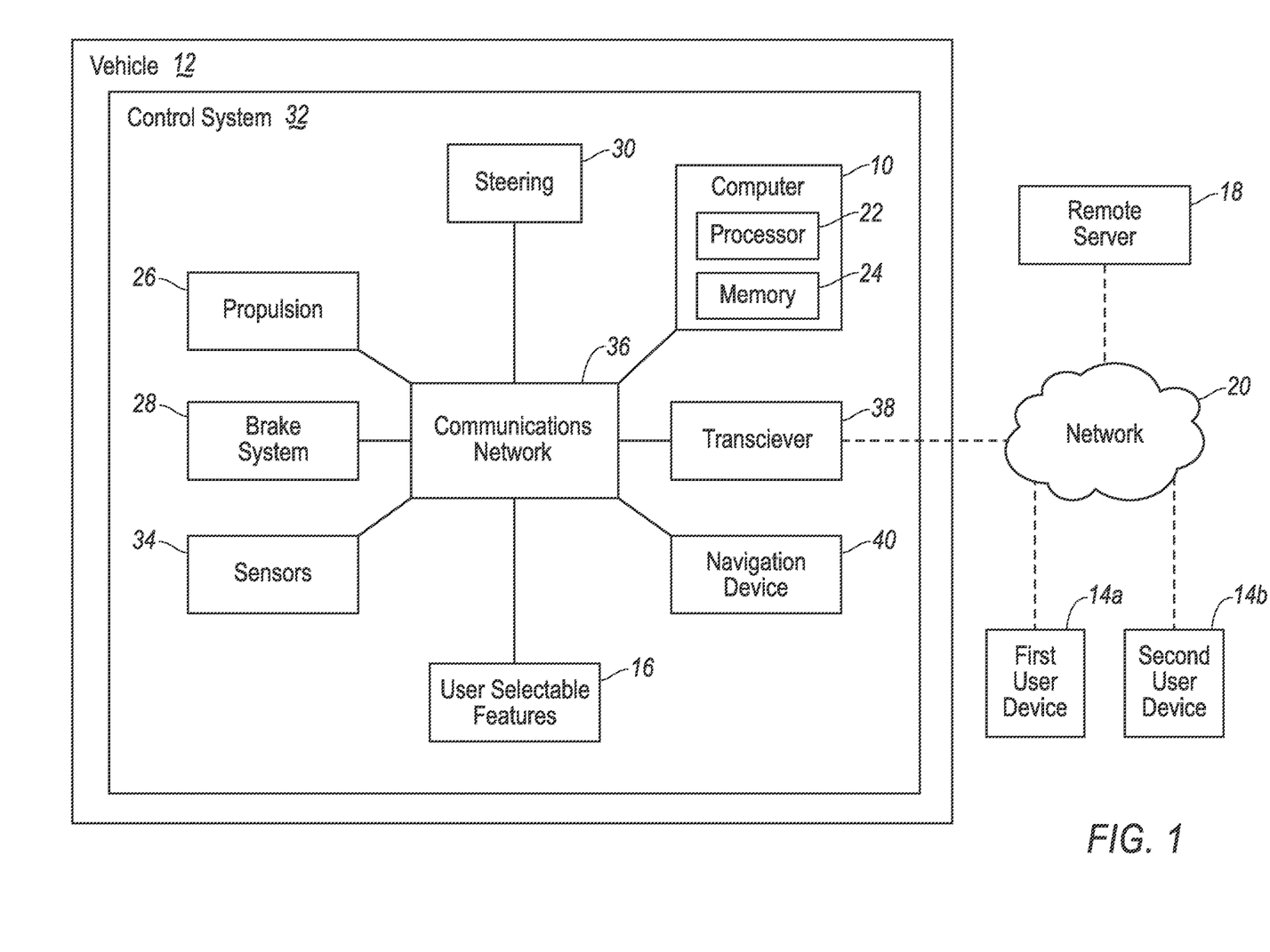
FIG. 1 is a block diagram of a vehicle feature control system for an example autonomous vehicle.

With reference to FIG. 1, a computer 10 in a vehicle 12 is programmed to wirelessly connect to a first user device 14a and a second user device 14b authorized to access, respectively, first and second sets of pluralities of vehicle 12 features 16. The first and second sets differ by at least one feature 16. The computer 10 is further programmed to actuate a feature 16 from the first set upon receipt of a first device command, e.g. from the first user device 14a, and actuate a feature 16 from the second set upon receipt of a second device command, e.g., from the second user device 14b.

The programming of the computer 10 solves a problem in autonomous vehicles, namely, how to allocate control of various vehicle features 16 to one or more users. An owner of the vehicle 12, such as a transportation service, may limit user access to the vehicle features 16, such as offering access to the features 16 on an a la carte basis to individual users. The programming of the computer 10 provides such access.

Information for executing the programming of the computer 10, e.g., information regarding the first and second sets of vehicle features 16, and the respective first and second device commands, may be provided to the vehicle computer 10 and the first and second user devices 14a 14b from a remote or "cloud" server computer 18, e.g., accessed via a network 20.

The network 20 represents one or more mechanisms by which the vehicle computer 10 may communicate with remote computing devices, e.g., the server computer 18, and the first and second user devices 14a 14b. Accordingly, the network 20 may be one or more of various wired or wireless communication mechanisms, including any desired combination of wired (e.g., cable and fiber) and/or wireless (e.g., cellular, wireless, satellite, microwave, and radio frequency)

communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The Server Computer

The server computer 18 is a computing device that includes hardware, e.g. circuits, chips, antenna, etc., programmed to transmit, receive, and process information in and to and from the vehicle computer 10 and the first and second user devices 14a 14b, e.g., via the network 20. The server computer 18 includes a processor and a memory implemented in a manner as described below for a processor 22 and memory 24. For example, the server computer 18 may be programmed to receive a ride request and to transmit a ride command. The server computer 18 may use any suitable technologies, including those discussed herein.

The server computer 18 may be programmed to receive the ride request from the first and/or second user devices 14a 14b, e.g., transmitted via the network 20. The content of the ride request may be based at least on user input to the respective first or second user device 14a 14b. The ride request may include a pick-up location, a destination, a set of vehicle features, and an identification of the device to be associated with the request, e.g., a unique name, a phone number, an email address, etc.

The server computer 18 may be programmed to transmit the ride command to the first or second user device 14a 14b and the vehicle 12, e.g., via the network 20. The server computer 18 may identify the vehicle 12 to transmit the ride command to out of a fleet of vehicles based on the ride request, e.g., based on a distance from the vehicle 12 to the pick-up location, or based on features 16 of the vehicle 12 compared to the set of vehicle features. The ride command may include the pick-up location, the destination, the set of vehicle features, a network name, and one or more pieces of device authorization information. The server computer 18 may transmit the ride command in response to receiving the ride request.

Device authorization information is used by the vehicle 12 to distinguish among various user devices 14a 14b, and their associated feature sets, commands, and other communications.

The device authorization information may be unique information shared with the vehicle 12 and the first user device 14a or second user device 14b. For example, the device authorization information may be transmitted to the vehicle 12 and to only one of the first user device 14a or the second user device 14b, e.g. the first user device 14a and not the second user device 14b. Examples of such device authorization information include a unique password, a shared key, password generation information, e.g., a symmetric-key algorithm, etc.

The device authorization information may be information already known by the one of the first user device 14a or second user device 14b and not the other, e.g. the unique name, phone number, email address, etc. transmitted with the ride request from the first user device 14a or second user device 14b.

The User Devices

The first and second user devices 14a 14b may be any variety of mobile computing device configured for wireless communication. User devices 14a 14b are implemented via circuits, chips, or other electronic components. The first and second user devices 14a 14b may include hardware, such as an antenna, for facilitating communication between other computing devices, vehicles, etc. The first and second user devices 14a 14b may include hardware, such as a global positioning system (GPS), for determining a location of the respective devices 14a 14b. User devices 14a 14b include a user interface, e.g., a touch screen, a microphone, etc. User devices 14a 14b may use any suitable technologies, including those discussed herein. For example, user devices 14a 14b can include a personal computer (e.g., a laptop computer, a tablet, etc.), a smartphone, a personal digital assistant, a portable media player, as well as wearable devices such as smart watches, and/or any other suitable device.

The first and second user devices 14a 14b may be programmed to transmit the ride request to the server computer 18, e.g., via the network 20. For example, a user may input information to the first user device 14a via the user interface indicating the desired ride request information, e.g., the pick-up location, the destination, the set of vehicle features, etc. The pick-up location may be determined by the first user device 14a, e.g., with the GPS. The first user device 14a generates the ride request based at least on the ride request information input by the user, and/or determined by the first user device 14a. The first user device 14a may then transmit the generated ride request to the server computer 18 via the network 20.

The first and second user devices 14a 14b may be programmed to connect to the vehicle 12. For example, the first user device 14a may identify a network access point, also referred to as a hotspot, generated by the vehicle 12 based at least on the network name included in the ride command received by the first user device 14a. The first user device 14a may connect to the identified network, e.g., by transmitting a connection request to the vehicle 12. The connection request may include the device authorization information, e.g., the shared key.

The first and second user devices 14a 14b may be programmed to actuate the vehicle features 16 of the set of vehicle features included in the ride command received by the respective devices 14a 14b. For example, the first user device 14a may transmit instructions to the vehicle 12 to actuate the feature 16, e.g., to turn on a seat heater. For the purpose of enabling the vehicle 12 to authenticate the instruction, the instructions to perform such actuation include the device authorization information, e.g., the shared key included in the ride command.

The second user device 14b may programmed and operate as described above for the examples regarding the first user device 14a.

The Vehicle

The vehicle 12 may include any autonomous passenger or commercial automobile such as a sedan, a station wagon, a sport utility vehicle, a crossover vehicle, a van, a minivan, a taxi, a bus, etc. The computer 10, sometimes referred to as the vehicle controller, may be capable of operating the vehicle 12 independently of the intervention of a human driver, completely or to a greater or a lesser degree. The computer 10 may be programmed to operate a propulsion 26, a brake system 28, a steering 30, and/or other vehicle systems.

For purposes of this disclosure, an autonomous mode is defined as one in which each of the propulsion 26, the brake system 28, and the steering 30 of the vehicle 12 are controlled by one or more computers; in a semi-autonomous mode computer(s) of the vehicle 12 control(s) one or two of vehicle the propulsion 26, the braking system 28, and the steering 30.

The vehicle 12 includes a control system 32. The control system 32 includes the computer 10, the propulsion 26, the brake system 28, the steering 30, sensors 34, a communications network 36, a transceiver 38, a navigation device 40, and user selectable features 16. These components of the control system 32 may transmit information to one another through the communications network 36.

The propulsion 26 of the vehicle 12 translates stored energy into motion of the vehicle 12. The propulsion 26 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 26 can include an electronic control unit (ECU) or the like that actuates the propulsion 26 to move the vehicle 12, e.g., in response to a command from the computer 10 and/or from a human driver. The human driver may control the propulsion 26 via, e.g., an accelerator pedal and/or a gear-shift lever.

The brake system 28 resists the motion of the vehicle 12 to thereby slow and/or stop the vehicle 12, e.g., known vehicle braking subsystems. The brake system 28 may be friction brakes such as disc brakes, drum brakes, band brakes, etc.; regenerative brakes; any other suitable type of brakes; or a combination. The brake system 28 can include an electronic control unit (ECU) or the like that actuates the brake system 28 to resist the motion of the vehicle 12, e.g., in response to a command from the computer 10 and/or from a human driver. The human driver may control the brake system 28 via, e.g., a brake pedal.

The steering 30 controls the turning of the wheels, e.g., known vehicle steering subsystems. The steering 30 can include an electronic control unit (ECU) or the like that actuates the steering 30 to turn the wheels, e.g., in response to a command from the computer 10 and/or from a human driver. The human driver may control the steering 30 via, e.g., a steering wheel. The steering 30 may be a rack-and-pinion system with electric power-assisted steering, a steer-by-wire system, as are both known, or any other suitable system.

The sensors 34 may detect internal states of the vehicle 12, for example, wheel speed, wheel orientation, and engine and transmission variables. The sensors 34 may detect the position or orientation of the vehicle, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 34 may detect the external world, for example, radar sensors, scanning laser range finders, temperature sensors, light meters, light detection and ranging (LIDAR) devices, and image processing sensors such as cameras. The sensors 34 may include communications devices, for example, vehicle-to-infrastructure (V2I) or vehicle-to-vehicle (V2V) devices. The sensors 34 may be used by the computer 10 to gather information for autonomous navigation of the vehicle 12.

The communications network 36 includes hardware, such as a communication bus, for facilitating communication among vehicle components. The communications network 36 may facilitate wired or wireless communication among the vehicle components in accordance with a number of communication protocols such as controller area network (CAN), Ethernet, WiFi, Local Interconnect Network (LIN), and/or other wired or wireless mechanisms.

The transceiver 38 transmits and receives information wirelessly from other transceivers, either directly or via the network 20, enabling signals, data and other information to be exchanged with other computer and network systems. The transceiver is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers.

The navigation device 40 determines a location of the vehicle 12 based on stored map data. Map data may include roads and related data, such as a number of lanes and availability of a shoulder, parking lot and public rest area locations, etc. To determine the location, the navigation device 40 may rely on information from a global navigation satellite system, distance data from vehicle sensors 34 attached to a drivetrain of the vehicle 12, a gyroscope, an accelerometer, etc. The map data may be stored locally, such as on memory 24 or the navigation device 40. Additionally or alternatively, the map data may be stored on a remote computer or network, accessible via the network 20. Example navigation devices 14a 14b include known GPS (global positioning system) navigation devices, personal navigation devices, and automotive navigation systems.

The user selectable features 16 include features 16 of the vehicle 12 that may be controlled by an occupant of the vehicle 12. The user selectable features 16 may be selectively controlled by the computer 10 to permit or inhibit control by the occupant. Example user selectable features 16 include seat heating devices, power windows, cabin climate control systems, infotainment systems including media players, internet browsers, video games, etc., cabin lights, seat position and recline angle, access to a wireless internet connection via the transceiver 38, a cabin air filtration system, etc.

The computer 10 is a computing device that includes the processor 22 and the memory 24. The computer 10 is in electronic communication with, e.g., via the communications network 36, one or more input devices for providing data to the computer 10 and one or more output devices for receiving data and/or instructions from the computer 10, e.g., to actuate the output device. Example input devices include: the sensors 34, the transceiver 38, the navigation device 40, the user selectable features 16, etc., as well as other sensors and/or electronic control units (ECUs) that provide data to the computer 10. Example output devices that may be actuated by the computer 10 include: the propulsion 26, the brake system 28, the steering 30, the transceiver 38, the navigation device 40, the user selectable features 16, etc.

The processor 22 is implemented via circuits, chips, or other electronic components and may include one or more microcontrollers, one or more field programmable gate arrays (FPGAs), one or more application specific circuits (ASICs), one or more digital signal processors (DSPs), one or more custom integrated circuits, etc. The processor 22 is programmable to process the data received via the sensors 34, the transceiver 38, the user selectable features 16, the memory 24, etc., as well as other sensors and/or electronic control units (ECUs) that provide data to the computer 10, e.g., on the communications network 36. Processing the data and communications may include processing to: wirelessly connect to the first and second user devices 14a 14b authorized to access, respectively, first and second sets of vehicle features; wherein the first and second sets differ by at least one feature 16; actuate a feature 16 from the first set upon receipt of a first device command; and actuate a feature 16 from the second set upon receipt of a second device command. The processor may further be programmed for performing the processes described herein.

The memory 24 is implemented via circuits, chips or other electronic components and can include one or more of read only memory (ROM), random access memory (RAM), flash memory, electrically programmable memory (EPROM), electrically programmable and erasable memory (EEPROM), an embedded MultiMediaCard (eMMC), a hard drive, any volatile or non-volatile media, etc. The memory 24 may store programming instructions for performing the processes described herein, and data collected from sensors and communications.

The computer 10 may be programmed to receive information associated with the first user device 14a, and information associated with the second user device 14b. For example, the computer 10 may receive a first ride command from the server computer 18, e.g. via the network 20. The received first ride command may include a first pick-up location, a first destination, a first set of vehicle features, a network name, and first device authorization information, e.g., a first shared key. The various pieces of information in the first ride command are associated with each other, e.g., the first set of vehicle features is associated with the first shared key. Similarly, the computer 10 may receive a second ride command from the server computer 18. The received second ride command may include a second pick-up location, a second destination, a second set of vehicle features, the network name, and second device authorization information, e.g., a second shared key. The various pieces of information in the second ride command are associated with each other, e.g., the second set of vehicle features is associated with the second shared key. The first and second ride command may also be transmitted to the vehicle 12, e.g. from the server computer 18 via the network 20.

The first set of vehicle features is different than the second set of vehicle features, e.g., the first set of vehicle features includes at least one feature 16 not present in the second set of vehicle features, and/or vice versa. The first set of vehicle features is specified by user input not associated with the second user device 14b, e.g., by user input associated only with the first user device 14a. For example, the first user device 14a may receive the first ride command including the first set of vehicle features, e.g., from the server computer 18, that was generated in response to receiving the first ride request from the first user device 14a, e.g., based at least on user input to the first device. The second user device 14b does not receive the first ride command. Similarly, the second set of vehicle features is specified by a user input not associated with the first user device 14a, e.g., by a user input associated only with the second user device 14b, as described above for the first user device 14a.

The computer 10 may be programmed to navigate the vehicle 12 to various locations, e.g., the first pick-up location, the second pick-up location, the first destination, the second destination, etc. For example, the computer 10 may transmit commands via the communications network 36 to the propulsion 26, brake system 28, and steering 30, instructing actuation to move the vehicle 12 to such location based at least on information received from the navigation device 40 and sensors 34.

The computer 10 may be programmed to actuate the transceiver 38 to generate a hotspot, such as is known, upon arrival at the first location. The hotspot is a wireless communication network that is identifiable by a computing device, e.g., the first and second user devices 14a 14b. For example, the computer 10 may determine the vehicle 12 is at the pick-up location, e.g., based at least on information received from the navigation device 40. Upon determination that the vehicle 12 is at the pick-up location, the computer 10 may actuate the transceiver 38 to generate the hotspot, e.g., by transmitting an instruction to the transceiver 38 to make itself discoverable by other computing devices, such as the first and/or second user devices 14a 14b.

The computer 10 may be programmed to wirelessly connect to first and second user devices 14a 14b authorized to access, respectively, the first and second sets of vehicle features. For example, the computer 10 may receive a connection request from the first user device 14a. To verify authorization, the connection request includes the first device authorization information, e.g., the first shared key transmitted to the vehicle 12 and the first user device 14a from the server computer 18 as part of the first ride command. In response to receiving the connection request with the matching first device authorization information, the computer 10 wirelessly connects to the first user device, e.g., by instructing the transceiver 38 to enable such connection. Similarly, the computer 10 may receive a connection request from the second user device 14b including the second device authorization information transmitted to the vehicle 12 and the second user device 14b. In response to receiving the connection request with the matching second device authorization information, the computer 10 may wirelessly connect to the second user device.

The computer 10 may be programmed to actuate a feature 16 from the first set of vehicle features upon receipt of an authorized first device command. For example, after the computer 10 receives the first ride command, e.g. from the server computer 18, including the first set of vehicle features and first device authorization information, the computer 10 may receive a feature actuate command including a feature 16 to be actuated and device authorization information. The computer 10 may compare the feature 16 of the actuation command with the first set of vehicle features, and the device authorization information of the actuation command with the first device authorization information. Upon determination that the feature 16 is included in the set of features, and that the device authorization information of the actuation command matches the first device authorization information, the computer 10 may transmit an actuation instruction to the feature 16, e.g., via the communications network 36. The computer 10 may be programmed to actuate a feature 16 from the second set upon receipt of an authorized device command including the second device authorization information, similar to that described above.

The computer 10 may be programmed to add an additional feature 16 to the first set of vehicle features upon receipt of an add feature command associated with the first user device. For example, the computer 10 may receive, e.g., from the first user device 14a and/or server computer 18, an add feature command including a feature 16 to be added to the set of vehicle features and device authorization information. The computer 10 may compare the device authorization information of the add feature command with the first device authorization information. Upon determination that the compared device authorization information matches, the computer 10 may add the feature 16 of the add feature command to the set of vehicle features, e.g., by storing the added feature 16 in the first set of vehicle features on the memory 24.

The computer 10 may be programmed to delete device authorization information upon arrival at a destination associated with device authorization information. For example, the computer 10 may determine that the vehicle 12 has arrived at the first destination, e.g., based at least on information received from the navigation device 40. Upon such determination, the computer 10 may delete the first device authorization information, e.g., deleting the first shared key from the memory 24. The computer 10 may additionally delete other information associated with the destination, e.g., any and/or all information included in the ride command having the destination.

The computer 10 may be programmed to delete device authorization information upon receipt of a payment confirmation associated with the device authorization information. For example, the computer 10 may receive payment confirmation, e.g., from the first user device 14a and/or the server computer 18, including the first device authorization information. Upon such receipt, the computer 10 may delete the first device authorization information, e.g., from the memory 24, and information associated with the first device authorization information, e.g., any and/or all information included in the first ride command.

The computer 10 may be programmed to actuate the transceiver 38 to terminate the hotspot upon arrival at a destination, e.g., the second destination. For purposes of terminating the hotspot, the second location is the last destination the vehicle 12 is scheduled to visit, i.e., the user device, such as the second user device 14b, is the only user device wirelessly connected to the computer 10. For example, the computer 10 may determine that the vehicle 12 has arrived at the second destination, e.g., based at least on information received form the navigation device 40. Upon such determination, the computer 10 may actuate the transceiver 38 to cease providing a wireless connection to other computing devices and make itself not discoverable.

The Processes

Figure 2:
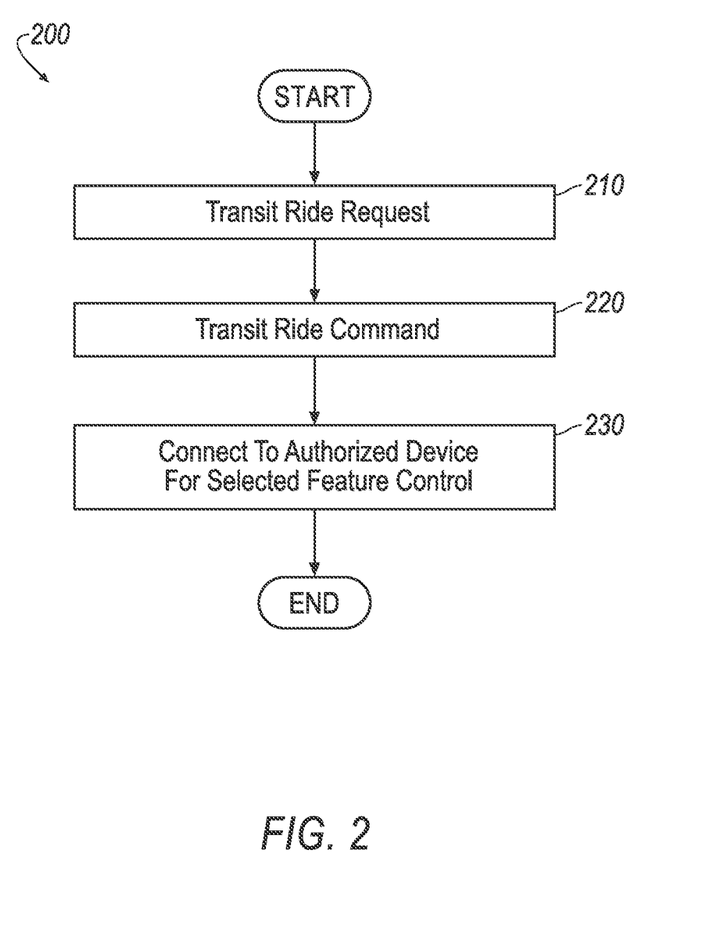
FIG. 2 is a flow chart of an example process for allocation of vehicle feature control to multiple users.

FIG. 2 is a process flow diagram illustrating an exemplary process 200 for selectively allocating control of various vehicle features 16 to one or more users. The process 200 begins in a block 210 when a first user determines a ride is required and inputs corresponding information into a first user device 14a.

At the block 210 a first ride request and a second ride request are transmitted by the first user device 14a and the second user device 14b, respectively, to the server computer 18 via the network 20. The ride requests may be transmitted to the server computer by addressing the transmission to a specific email address, internet protocol address, etc. The ride requests are generated based on user input to the respective first and second user device 14b.

Next, at a block 220 the server computer 18 receives the first ride request and the second ride request. Based on the first and second ride request, the server computer 18 generates a first and second ride command, respectively. The first ride command may be transmitted to the first user device 14a and a vehicle 12, e.g., selected by the server computer 18 out of a fleet of vehicles. The second ride command may be transmitted to the second user device 14b and the vehicle 12. The ride commands may be transmitted to the vehicle 12 and user devices 14a 14b, e.g., via the network 20 by addressing the transmission to a specific email address, internet protocol address, etc.

Next, at a block 230, the vehicle 12 (i.e., the computer 10) receives the first and second ride commands. Based on the ride commands, the vehicle 12 performs ride service and allows control of selected features 16 by authorized user devices 14a 14b. For example, the vehicle 12 may navigate to the closer (in distance-to-travel to reach the location) of a first and second pick-up locations include in the respective ride commands. The vehicle 12 may then generate a hotspot and connect to one of the first and second user devices 14a 14b based on such device being authenticated, e.g., having matching device authorization information. The vehicle 12 may then navigate to the first user device 14a or second pick-up location (whichever has not yet been performed), and connect to the first or second user device 14b (whichever has not yet connected) with a similar authorization to that described above. The vehicle 12 may then navigate to the closer (in distance-to-travel to reach the location) of the first and second destinations.

While navigating the vehicle 12 may receive and perform authorized feature commands, e.g., actuate a seat heater, including device authorization information that matches device authorization information associated with a feature set included the feature 16 to be actuated. After the navigating to the closer of the first or second destinations, the vehicle navigates to the other of the first or second destination. Upon arriving at the later (temporally) of the first or second destinations, the vehicle 12 terminates the hotspot. After the block 230, the process 200 ends.

Figure 3:
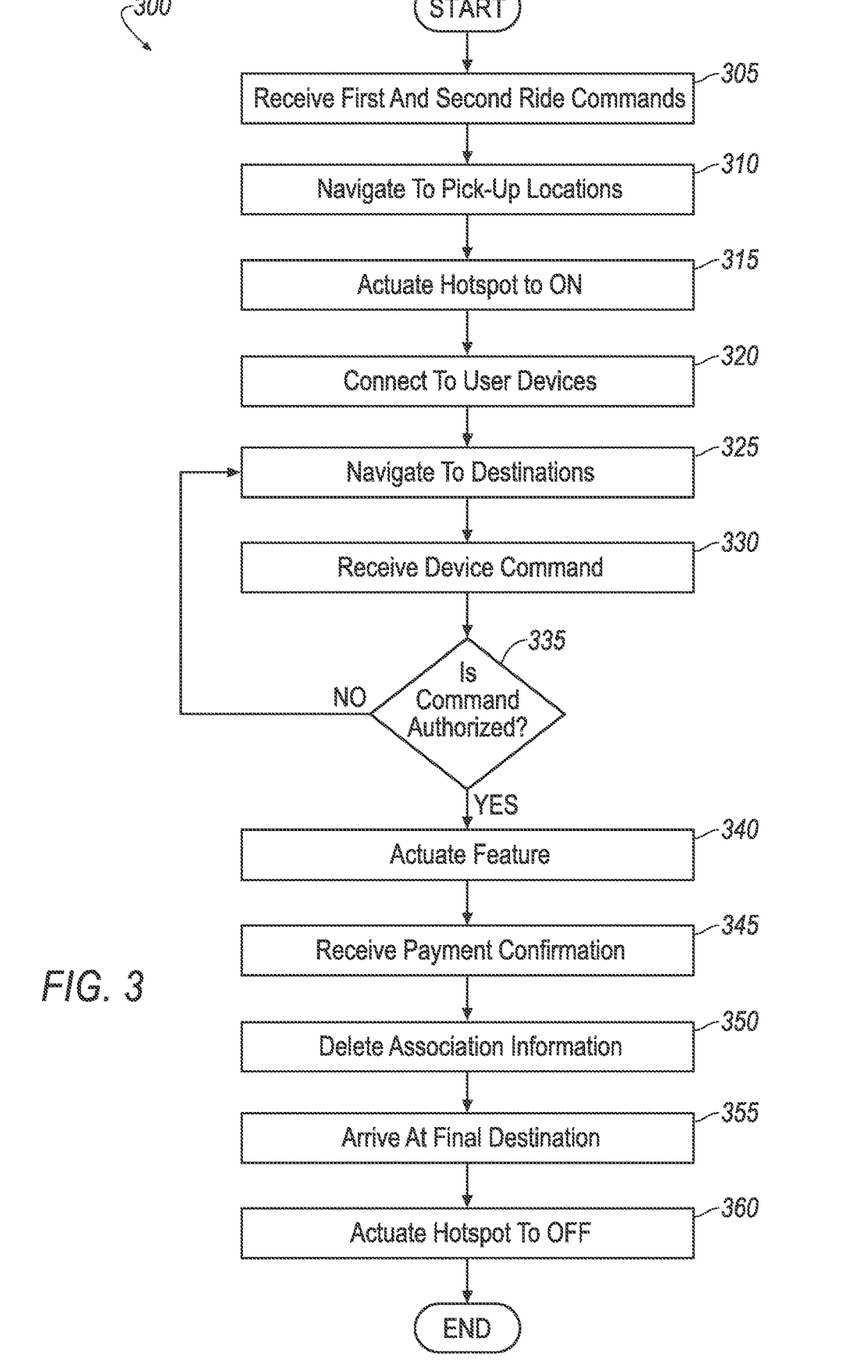
FIG. 3 is a flow chart of an example process for controlling a vehicle to allocate feature control to multiple users.

FIG. 3 is a process flow diagram illustrating an exemplary process 300 for controlling the vehicle 12 to selectively allocate control of various vehicle features 16 to among multiple user devices 14a 14b. The process 300 begins in a block 305 when the vehicle 12 is turned on or otherwise placed in an operable mode.

At the block 305 the computer 10 receives ride commands, e.g. the first and second ride commands from the server computer 18.

At the block 310 the computer 10 navigates the vehicle 12 to the first and second pick-up locations. The computer 10 may first navigate to the closer (in distance-to-travel to reach the location) of the first and second pick-up locations.

At a block 315 the computer 10 generates the hotspot, e.g., with the transceiver 38. The computer may generate the hotspot upon arrival at the first (temporally) of the first and second pick-up locations, e.g., based at least on information received from the navigation device 40.

At a block 320 the computer 10 connects to the first and second user devices 14a 14b. The computer 10 authorizes the first and second user devices 14a 14b, e.g., based on receiving matching device authorization information, when establishing such connection.

At a block 325 the computer 10 navigates the vehicle 12 to the first and second destinations. The computer 10 may navigate to the closer (geographically) of the first and second destinations first (temporally). The computer 10 may continue to navigate to the first and second destinations throughout the process 300.

At a block 330, while navigating to the various pick-up locations and destinations, the computer 10 receives a device command to actuate a feature 16, e.g., from the first user device 14a or second user device 14b.

Next, at a block 235 the computer 10 determines whether the device command to actuate the feature 16 is authorized. When the command includes matching device authorization information associated with a set of features including the feature 16 of the device command, the device command is determined to be authorized, and the process moves to a block 340. Else, e.g., when no matching device authorization information is provided, and/or the feature 16 of the device command is not in the list of features, the process moves to the block 325 and continues to navigate to the first or second destination.

At the block 340 the computer 10 actuates the feature 16 of the authorized feature command from the blocks 330 and 335, e.g. by transmitting an actuation command via the communications network 36.

At a block 345 the computer 10 receives payment confirmation, e.g., from the first or second user devices 14a 14b, or from the server computer 18.

Next, at a block 350 the computer 10 deletes the first or second device authorization information, e.g., which ever device authorization information is associated with the received payment.

At a block 355 computer 10 identifies the vehicle 12 has arrived at a final destination, i.e., the later (temporally) of the first and second destinations, e.g., based at least on information received form the navigation device 40.

Next, at a block 360 the computer 10 terminates generation of the hotspot. Termination of the hotspot generation may be done upon arrival at the final destination. After the bock 360 the process 300 ends.

Conclusion

Computing devices discussed herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

As used herein the term "based on" is used in an open ended manner and may be interpreted as meaning based at least on.

Unless indicated otherwise, the adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer having a processor and a memory storing instructions executable by the processor to:
receive, from a server computer, one or more ride commands specifying first and second user devices authorized to access, respectively, first and second sets of pluralities of vehicle features that differ by at least one feature, the one or more ride commands specifying a pick-up location or a destination;
wirelessly connect to the first and second user devices;
actuate a feature from the first set upon receipt of a first device command; and
actuate a feature from the second set upon receipt of a second device command.

2. The system of claim 1, wherein the memory stores instructions executable by the processor to:
actuate a transceiver to generate a hotspot upon arrival at the pick-up location.

3. The system of claim 2, the computer further programmed to:
actuate the transceiver to terminate the hotspot upon arrival at the destination.

4. The system of claim 1, wherein the memory stores instructions executable by the processor to:
add an additional feature to the first set of vehicle features upon receipt of an add feature command associated with the first user device.

5. The system of claim 1, wherein the memory stores instructions executable by the processor to:
receive a first device authorization information associated with the first set of vehicle features and a second device authorization information associated with the second set to vehicle features;
wherein the command from the first device includes the first device authorization information and the command from the second device includes the second device authorization information.

6. The system of claim 5, wherein the first device authorization information and the second device authorization information include a symmetric-key algorithm.

7. The system of claim 5, wherein the memory stores instructions executable by the processor to:
delete the first device authorization information upon receipt of a payment confirmation associated with the first device authorization information.

8. The system of claim 5, wherein the memory stores instructions executable by the processor to:
add an additional feature to the first set of vehicle features upon receipt of an add feature command including the first device authorization information.

9. The system of claim 1, wherein the first set of vehicle features is specified by user input not associated with the second user device, and the second set of vehicle features is specified by a user input not associated with the first user device.

10. The system of claim 1, wherein the first set of vehicle features is specified by user input associated only with the first user device, and the second set of vehicle features is specified by a user input associated only with the second user device.

11. A method comprising:
receiving, from a server computer, one or more ride commands specifying first and second user devices authorized to access, respectively, first and second sets of pluralities of vehicle features that differ by at least one feature, the one or more ride commands specifying a pick-up location or a destination;
wirelessly connecting to a first and second user devices authorized to access, respectively, first and second sets of vehicle features; wherein the first and second sets differ by at least one feature;
actuating a feature from the first set upon receipt of a first device command; and
actuating a feature from the second set upon receipt of a second device command.

12. The method of claim 11, further comprising:
actuating a transceiver to generate a hotspot upon arrival at the pick-up location.

13. The method of claim 12, further comprising:
actuating the transceiver to terminate the hotspot upon arrival at the destination.

14. The method of claim 11, further comprising:
adding an additional feature to the first set of vehicle features upon receipt of an add feature command associated with the first user device.

15. The method of claim 11, further comprising:
receiving a first device authorization information associated with the first set of vehicle features and a second device authorization information associated with the second set to vehicle features;
wherein the first device command from the first user device includes the first device authorization information and the second device command from the second user device includes the second device authorization information.

16. The method of claim 15, wherein the first device authorization information and the second device authorization information include a symmetric-key algorithm.

17. The method of claim 15, further comprising:
deleting the first device authorization information upon arrival at a destination associated with first device authorization information.

18. The method of claim 15, further comprising:
deleting the first device authorization information upon receipt of a payment confirmation associated with the first device authorization information.

19. The method of claim 15, further comprising:
adding an additional feature to the first set of vehicle features upon receipt of an add feature command including the first device authorization information.

20. A system, comprising a computer having a processor and a memory storing instructions executable by the processor to:
wirelessly connect to first and second user devices authorized to access, respectively, first and second sets of pluralities of vehicle features that differ by at least one feature;
receive a first device authorization information associated with the first set of vehicle features and a second device authorization information associated with the second set to vehicle features;
actuate a feature from the first set of vehicle features upon receipt of a first device command, the first device command from the first user device and including the first device authorization information;
actuate a feature from the second set of vehicle features upon receipt of a second device command, the second device command from the second user device and including the second device authorization information; and
delete the first device authorization information upon arrival at a destination associated with first device authorization information.

* * * * *